Dec. 31, 1968  F. T. MAYERS ET AL  3,419,098
THREE-WHEELED AUTOMOTIVE VEHICLE
Filed Dec. 13, 1966
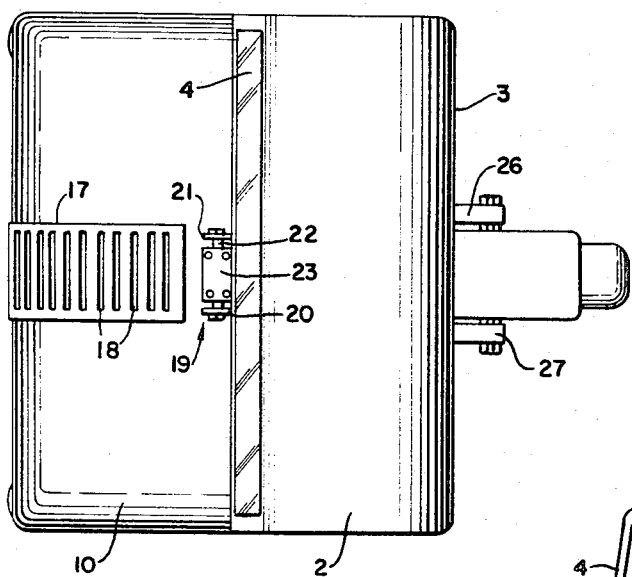
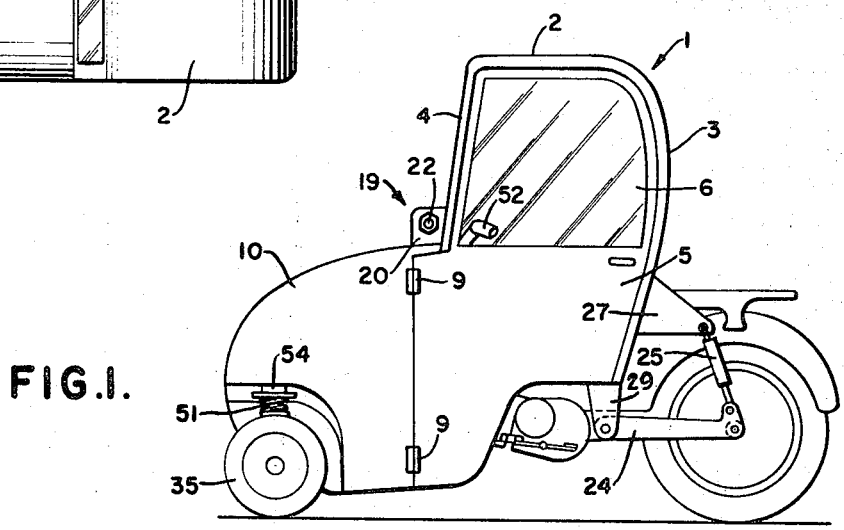
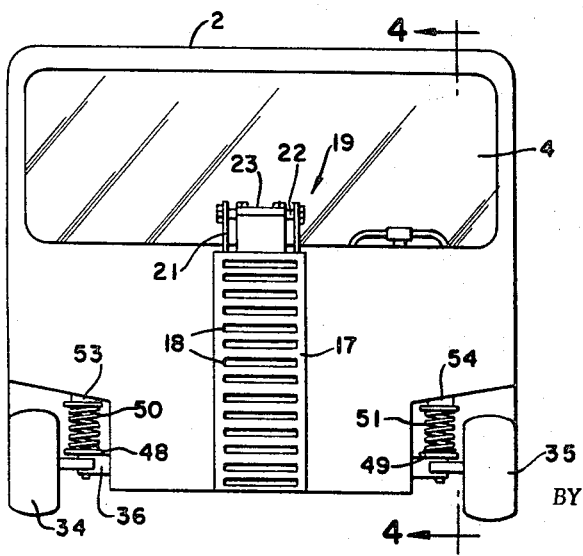
INVENTORS
Fred T. Mayers &
Ralph L. Dombrower, Jr.
BY Elizabeth Newton Dew
ATTORNEY

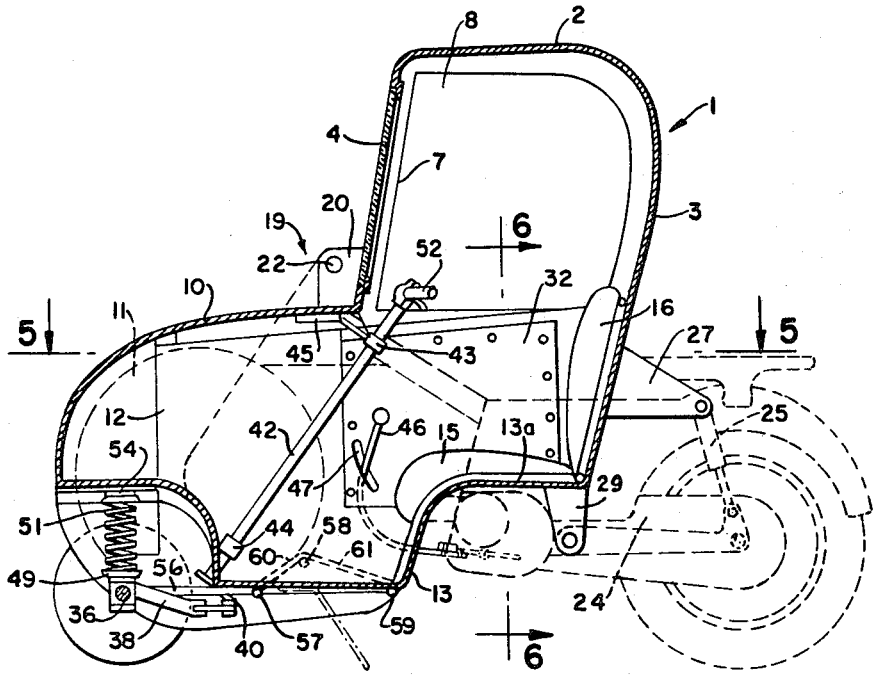

United States Patent Office 3,419,098
Patented Dec. 31, 1968

3,419,098
THREE-WHEELED AUTOMOTIVE VEHICLE
Fred T. Mayers, Rte. 5, Box 16A, Courtney Road, Glen Allen, Va. 23060, and Ralph L. Dombrower, Jr., 7309 W. Franklin St., Richmond, Va. 23226
Filed Dec. 13, 1966, Ser. No. 601,362
8 Claims. (Cl. 180—25)

ABSTRACT OF THE DISCLOSURE

A three-wheeled automotive passenger or delivery vehicle which is powered by a motorcycle of conventional construction and driven by the rear wheel thereof, and which requires no substantial mechanical changes in the motorcycle.

This invention relates to three-wheeled automotive vehicles.

It is the chief object of the invention to provide a device in the nature of an attachment having two laterally-spaced steerable front wheels, to which a motorcycle of conventional construction may be facilely and operatively attached.

Another object is to provide a vehicle as in the preceding paragraph, wherein the third wheel of the vehicle is supplied by the rear wheel of the motorcycle.

Yet another object is to provide a vehicle which embodies as a component part thereof, a motorcycle of known construction, and which utilizes the engine, transmission and rear wheel of the motorcycle, all without material change or alternation, for propulsion of the vehicle.

Still another object is to provide a three-wheeled motor-driven vehicle which is stable, capable of carrying a passenger in addition to the driver, as well as a substantial load of material or articles to be transported or delivered.

A further object is to provide a three-wheeled automotive vehicle of great utility and versatility because of its relatively inexpensive and simple construction, reliability, low cost per mile of operation, and capable of sustained operation for long periods of time.

Another object is to provide a vehicle of the kind and type aforesaid, wherein the motorcycle used for propulsion may be readily detached when desired, used as a two-wheeled vehicle, then reconnected and reassembled to form a three-wheeled vehicle as before.

A still further object is to provide an article of manufacture in the nature of an attachment, having steerable front wheels and capable of assembly with a motorcycle to support the front wheel thereof clear of the ground, while the rear wheel of the motorcycle engages the ground and is used for propulsion.

Another object is the provision of an article as in the preceding paragraph, which may be attached to any selected one of a number of different types and makes of motorcycles, as and for the purposes previously expressed.

Yet another object is to provide an article of manufacture which when assembled with a motorcycle, affords a complete and operative vehicle having a closed compartment for protection from the elements, of the driver, as well as a passenger or cargo, and which at the same time affords a substantial degree of protection to the driver and passenger, in event of accident.

Other objects and advantages of our invention will become apparent to those skilled in the art, after a study of the following detailed description, in connection with the accompanying drawing.

In the drawing:

FIGURE 1 is a side elevation of the invention applied to a motorcycle, and showing how the rear wheel of the motorcycle is utilized for propulsion of the assembled vehicle;

FIGURE 2 is a top plan view of the assembled vehicle of FIGURE 1;

FIGURE 3 is a front elevation corresponding to FIGURES 1 and 2;

FIGURE 4 is a vertical section about in a plane identified by line 4—4, FIGURE 3, essential parts of the motorcycle being shown in dotted lines;

FIGURE 5 is a horizontal section about in a plane identified by line 5—5, FIGURE 4, looking in the direction of the arrows; and FIGURE 6 is a detail sectional view taken in a plane identified by line 6—6, FIGURE 4, looking in the direction of the arrows.

In general the invention comprises a body of rigid sheet metal of fiber glass, shaped to define a central, inverted, vertical channel open at its forward and rearward ends, and into which the forward wheel and frame portion of a motorcycle may be introduced. Means to be described in detail, are provided by which the body is operatively connected with the motorcycle. The body is equipped with two front wheels of relatively small diameter, highed on kingpin assemblies to the respective ends of a front axle, and connected with steering means within the body. The body, as shown, may be formed and shaped to provide a closed cab including a roof, windshield and side entrance doors, right and left. The two compartments thus formed at the respective sides of the channel or tunnel, are equipped with seats. The left seat is for the driver and the right one accommodates a passenger. Alternatively the right seat may be omitted and the space given over to cargo such as mail, parcels to be delivered, or materials of any kind to be transported.

The two front wheels are spring mounted and, together with the conventional springing and shock absorbing means of the motorcycle, affords a vehicle which is comfortable, weather-proof, easily handled in traffic and extremely versatile in use. All controls are conveniently arranged for the driver.

In the model shown, a body generally identified at 1, is formed of a number of sections of pressed sheet metal or molded fiber glass. The sections are united as by welding, riveting, or other suitable means, to form a strong rigid enclosure for the driver, passenger, and goods or materials to be delivered or transported. The body includes a top 2, back wall 3 which may have a window, not shown, windshield 4, left door 5 with window 6, and right door 7 with window 8.

As shown for door 5, FIGURE 1, the doors may be hinged as at 9, to vertical reinforcements fixed to and within hood 10 at the respective rear edges thereof. Headlamps, tail lamps and other running lamps, not shown, may be carried by brackets attached to the body at appropriate locations. Hood 10 curves forwardly and downwardly at the front, in general conformity with the front wheel of a motorcycle, as indicated at 11, FIGURE 4.

Inside, the body includes a central longitudinally-extending tunnel or channel 12 and which, as illustrated in FIGURE 6, has a generally flat, forwardly- and downwardly-sloping top surface, and side walls which flare downwardly and outwardly to merge smoothly into floor portions 13 and 14. The tunnel is sized and shaped to accommodate the motorcycle with a smooth fit, after the handlebar and seat assembly of the motorcycle have been removed. As best shown upon FIGURE 4, for floor portion 13, these portions curve upwardly and rearwardly to form supports for seat cushions, as indicated at 13a. At their rearward edges these seat portions are rigidly united with the lower edge of back 3, in a continuous seam.

A seat for the driver, including cushions 15 and 16 are fixed to portion 13a and backwall 3, respectively, at the left side of the tunnel. As clearly shown upon FIGURES 4, 5 and 6, the side walls of tunnel 12 are formed with openings 30, 31, left and right, to afford access to the engine and other operating parts of the motorcycle. The openings are normally closed by plates 32, 33, removably secured in place by self-tapping screws. It is contemplated that the left floor portion where the left foot of the driver ordinarily rests, may be cut away as indicated at 61, FIGURE 5, to provide an opening when the door is open, so that he may put one or both feet on the ground to push the vehicle a short distance rearwardly. The left door will then have a generally horizontal, inwardly-projecting shelf 62 fixed with its lower edge. When the door is closed, the shelf will interfit with the edges of the floor recess or opening and thus form a continuous and imperforate floor surface when the door is closed. This feature may also be provided for the right door.

Tunnel 12 is open at its front end to admit cooling air to the engine, and at its rearward end to enable the motorcycle to be emplaced for operative connection with the body and parts fixed thereto. A grill 17 of arcuate form, having air-entrance slots 18, is secured over a central forward opening in the hood and conceals the forward opening of the tunnel or channel. Space under the hood at either side of the tunnel may be utilized for carrying baggage or supplies. Hinged doors, not shown, afford access to these spaces.

As indicated in dotted lines, FIGURE 4, front wheel 11 of the motorcycle is supported by body 1 in a position elevated above the ground and is held in fixed position with respect to the body. For this purpose the tunnel 12 at its forward lower end is provided with a rigid transverse metal plate or pan curved in the forward and transverse vertical planes to conform generally to the lower forward portion of the wheel tire. The pan also forms a stiffening reinforcement for the body.

At the top rear portion of hood 10, a bracket generally identified at 19, FIGURES 1 through 4, provides for a rigid connection between body 2 and the front fork of the motorcycle. While the precise construction of this connection will depend upon the motorcycle to be used for propulsion, in the model shown, the bracket consists of two transversely-spaced lugs 20, 21 rigidly secured to the body just forwardly of windshield 4 and pierced with transversely aligned holes. At the top of its front fork, the motorcycle has a removable cross piece or bolt 22 between and connecting the tubular fork members at their top ends. The unitary handlebar assembly is fixed to this cross piece by a removable clamp. In connecting the front fork and wheel with the body, the clamp and bolt are removed. The bolt or a specially constructed substitute therefor, is secured in and between the apertures in lugs 20, 21. The motorcycle with its handlebar and seat assemblies removed, is moved into the tunnel until the front wheel drops into the aforesaid pan and the clamp seat formerly accommodating the handlebar assembly engages the lower half of the bolt or shaft. A cap 23 which may be the one originally supplied with the motorcycle, is then fastened in place with bolts or machine screws to fix the fork of the motorcycle to the shaft and thus to body 2. In assembly a removable clamp may be used to initially stress the shock absorber springs of the fork. This reduces the effective length of the fork and enables the front wheel and fork to ride easily into position with the wheel supported upon the pan. The clamp is then removed. The dimensions are such that with this clamp removed, the front springs are under compression and thus act to firmly hold the wheel within the pan.

At the rearward end of the body, attachment to the motorcycle is effected in a way which depends to some extent upon the rear spring and shock absorber assembly of the machine. In the model shown the motorcycle is equipped with driving rods, right and left. The left one of these is identified at 24, FIGURES 1 and 4. Before assembly to body 2 these rods are disconnected from the cycle at their forward ends. Likewise the upper ends of the two spring-and-shock-absorber assemblies are detached. The left one of these is identified at 25, FIGURES 1 and 4.

A first pair of brackets 26, 27 are integrally connected to a reinforced area of back wall 3, in laterally spaced parallel relation. After the motorcycle is fully emplaced within tunnel 12 the upper ends of these shock absorbers are pivotally attached to the ends of the respective brackets. Bearing holes or pins are provided for this purpose, in the ends of the brackets. A second pair of brackets 28, 29, right and left, FIGURE 6, are integrally connected to a reinforced area of floor or seat portions 13a, 14a, and depend therefrom in parallel laterally-spaced relation. The forward ends of drive rods 24 are pivotally connected with the lower ends of these brackets, respectively, as shown upon FIGURES 1 and 4. After assembly in the manner just described, propelling force exerted by the rear wheel is transmitted to body 2 through brackets 28, 29. At the same time, the motorcycle is fixed against side sway relatively to the body but may pivot relatively to the body in the central vertical plane of the tunnel or channel to provide springing and shock absorbing movement. Alternatively it is contemplated that the saddle of the motorcycle may be removed and the support therefor supplied as a part of the machine, directly connected to a reinforced bracket fixed with back wall 3 adjacent the rear upper surface of the tunnel, or within the tunnel. In this case, drive rods and shock absorbers 24, 25, etc. will be left attached to the motorcycle, thus further simplifying assembly.

At the front, right and left wheels 34, 35 are mounted by respective kingpin assemblies to the ends of axle 36. Referring more particularly to FIGURE 5, the ends of steering arms 37, 38, forming parts of the respective kingpin bearing sleeves, are interconnected by tie rod 39. Lever 38 has an integral rearward extension to the end of which steering link 40 is pivoted. The other end of this link is pivoted by a ball and socket joint, not shown, to the end of a lever 41 fixed to the lower end of steering shaft or column 42. The connection between steering arm 38 and link 40 is also of the ball-and-socket type.

Shaft 42 is journaled in spaced bearings 43, 44, top and bottom, FIGURES 4 and 5. Bearing 43 is secured to the distal end of a bracket 45 fixed to the cowl portion of hood 10. Item 44 is a combined journal and thrust bearing.

Shaft 42 extends upwardly and rearwardly and at its top end has handlebar 52 of the motorcycle, fixed thereto in position for convenient actuation by the driver. It is contemplated that the standard handlebar control levers for the clutch and brake of the motorcycle will be used, as well as the customary rotatable grip for control of the engine throttle. The Bowden wires or cables through which the several controls are effected, extend from the handlebar through one or more openings in the side or top wall of the tunnel and may be used without change in mechanical details. Since these controls are conventional and supplied as a part of the motorcycle, they have not been shown. A gear shift lever 46, FIGURES 4 and 5, projects through slot 47 in plate 32. The free end of this lever is in position for convenient operation by the right hand of the driver, and is bolted or otherwise fixed to the shift pedal of the machine, within tunnel 12.

From FIGURES 1, 3 and 4 it is noted that body 2 is recessed at its lower front corners, to accommodate wheels 34, 35. The ends of axle 36 are supplied with seats 48, 49 to which the lower ends of coil springs 50, 51 are respectively anchored. The upper ends of these springs are attached to seats 53, 54, fixed to reinforced areas of the ceiling or top walls of the recesses. By a known construction shock absorbers, not shown, are mounted within these two springs. Drag links 55, 56, right and left, FIGURE 5, are connected with axle 36 at their forward ends and with a transverse reinforcement bar 57 at their rearward ends. A transverse drag link, not shown, may also be provided.

Bar 57 is shown upon FIGURES 4 and 5, and from FIGURE 4 in particular, it will be noted that this is one of two which extend transversely under the floor for the support thereof and for reinforcement and rigidifying the body. The other of these is identified at 59. From FIGURE 4 it is noted that these bars do not interfere with the motorcycle.

Pan 60, previously mentioned, includes a rearwardly- and upwardly-sloping portion hinged at its forward end to bar 57 and integrally connected at its rear end with a ramp plate 61. Ramp plate 61 slopes downwardly and rearwardly and has its rear edge detachably connected with bar 59. When detached, pan part 60 and ramp plate 61 may pivot downwardly as a unit until the rear edge of the plate contacts the ground. In this position of the parts the front wheel of the motorcycle is readily moved up plate 61 and into the forward portion of the pan. Thereafter the parts 60, 61 are pivoted back to normal position and ramp plate 61 is re-attached to bar 59. In this position pan part 60 acts positively to hold the wheel of the motorcycle in operative emplaced location as shown upon FIGURE 4. A removable cover 62 at the top of tunnel 12, FIGURE 5, gives access to the fuel tank filling opening of the motorcycle.

We have therefore provided a vehicle which fulfills all of the objects stated. It is relatively inexpensive to construct and when assembled with a motorcycle, affords very low cost and reliable transportation of particular utility in light-weight delivery. Servicing and repairs are simple and the motorcycle is readily detachable and reconverted to two-wheel use.

While we have disclosed the invention in the form presently preferred by us, numerous changes of shape, size and relations of parts, substitutions of equivalents, and alterations for adapting the invention to different kinds or conditions of use, will be obvious to those skilled in the art, after a knowledge of the disclosure. For example, a steering wheel and conventional worm-and-gear steering mechanism may be used. The body may be of an open type or merely a frame, without top 2, etc. Also it is contemplated that the front wheel of the motorcycle may be removed before the machine is emplaced and connected with body 1. In such a construction, the means of attachment of the front fork of the motorcycle would include a bracket fixed with body 2 and supporting the ends of a bolt inserted in and through the lower ends of the fork tines, in substitution for the front wheel axle. Bracket 19, etc., might be retained as shown. Additional load-carrying capacity may be provided over the rear wheel and within spaces enclosed by hood 10.

Having fully disclosed the invention, what we claim and desire to secure by Letters Patent is:

1. In a device for use as a three-wheeled automotive vehicle, a frame having a central longitudinal vertical plane, said frame comprising laterally-spaced vertical walls extending longitudinally on respective sides of said plane and interconnected at their top edges to define a tunnel open at its bottom and ends, said tunnel being constructed and arranged to receive a motorcycle, first means fixed with said frame at the forward end thereof, to receive and support, free of the ground, the front wheel of a motorcycle when positioned in and extending rearwardly in and along said plane, within said tunnel, right and left ground-engaging front wheels, second means mounting said wheels to said frame on respective sides of said plane, for rollably supporting said frame at the forward end thereof, third means interconnecting and mounting said front wheels for conjoint pivotal steering movement, support means fixed with said frame at one side of said plane, for supporting a driver, steering means operatively connected to said third means and operable by a driver on said support means, and fourth means carried by said frame at the rearward portion thereof, for connection with a motorcycle.

2. The device of claim 1, said driver support means including a floor extending horizontally outwardly from the lower edge of the contiguous one of said walls.

3. The device of claim 2, said driver support means also including a seat fixed with said frame at the rearward end of and elevated with respect to said floor.

4. The device of claim 2, said floor including a portion extending horizontally outwardly from and fixed with the other of said walls, at the other side of said plane.

5. The device of claim 1, said frame also comprising a body having a back wall, there being an opening centrally of and in said back wall, the side edges of said opening being united with the respective rear edges of said vertical walls, along their meeting edges, said fourth means including brackets fixed with said back wall, and adapted for connection with a motorcycle when positioned within said tunnel.

6. The device of claim 5, said body also including right and left hinged doors, a top and a windshield, said floor having a cut-out opening in the left outer edge thereof, said left door including a shelf secured to and extending inwardly from the lower edge thereof, to close said opening when said left door is in closed position.

7. The combination with a motorcycle having front and rear wheels, an engine, and driving means between the engine and rear wheel, a frame having a central vertically- and longitudinally-extending plane of symmetry, right and left ground-engaging, interconnected, steerable front wheels pivoted to said frame on respective sides of said plane, said frame including substantially vertical, laterally-spaced walls on respectively opposite sides of said plane, and means rigidly interconnecting said walls at and along their top edges, to define a tunnel open at its bottom, forward and rearward ends, and extending in and along said plane, said motorcycle being positioned in and extending along said tunnel, means fixed with said frame at the forward end of said tunnel, supporting the front wheel of said motorcycle, clear of the ground, means fixed with said frame at the rear thereof and engaging the motorcycle for support by the ground-engaging rear wheel thereof, means carried by said frame for support of a driver at one side of the contiguous vertical wall of said tunnel, steering means mounted in said frame for convenient operation by a driver on said support means, operating connections between said steering means and said front wheels, and controls connected with said driving means and in position for convenient operation by a driver on said support means.

8. The combination of claim 7, said frame comprising a body shell having unitarily interconnected floor, back wall, side doors, top and windshield, and first and second seats in said body shell for a driver and a passenger, at respective sides of said plane and tunnel.

References Cited

UNITED STATES PATENTS 1,702,840  2/1929  Ross.

FOREIGN PATENTS 28,310  6/1932  Netherlands.
400,542  12/1942  Italy.

A. HARRY LEVY, *Primary Examiner.*

U.S. Cl. X.R.

180—89; 296—28